United States Patent
Segura

(10) Patent No.: US 7,576,802 B1
(45) Date of Patent: Aug. 18, 2009

(54) DIGITAL MOTION PICTURE FILM ENHANCEMENT APPROACHES

(76) Inventor: Kevin T. Segura, 18230 SE. River Rd., Milwaukie, OR (US) 97267

( * ) Notice: Subject to any disclaimer, the term of this patent is extended or adjusted under 35 U.S.C. 154(b) by 816 days.

(21) Appl. No.: 11/248,768

(22) Filed: Oct. 11, 2005

(51) Int. Cl.
*H04N 7/01* (2006.01)

(52) U.S. Cl. .......................... 348/441; 348/452; 348/459

(58) Field of Classification Search .................. 348/97, 348/441, 443, 446, 448, 458, 459, 104, 451, 348/452; *H04N 7/01, 11/20, 9/11, 3/36*
See application file for complete search history.

(56) References Cited

U.S. PATENT DOCUMENTS

| | | | | |
|---|---|---|---|---|
| 6,108,041 | A * | 8/2000 | Faroudja et al. | 348/446 |
| 6,222,589 | B1 * | 4/2001 | Faroudja et al. | 348/448 |
| 7,333,545 | B2 * | 2/2008 | Durouz et al. | 375/240.25 |

OTHER PUBLICATIONS

Adobe, "Adobe After Effects 5.0—Effects, part 1," Adope Systems Inc., 2001, 45 pages.
Adobe, "Adobe After Effects 5.0—Effects, part 2," Adobe Systems Inc., 2001, 31 pages.
Adobe, "Adobe After Effects 5.0—Effects, part 3," Adobe Systems Inc., 2001, 20 pages.
Adobe, "Adobe After Effects 5.0—Effects, part 4," Adobe Systems Inc., 2001, 32 pages.
Adobe, "Adobe After Effects 5.0—Effects, part 5," Adobe Systems Inc., 2001, 29 pages.
Adobe, "Adobe After Effects 5.0—Effects, part 6," Adobe Systems Inc., 2001, 26 pages.
Adobe, "Adobe After Effects 5.5—Table of Effects in After Effects 5.5" Adobe Systems Inc., 2001, 5 pages.
Adobe, "Adobe After Effects 5.5—Effects, part 7," Adobe Systems Inc., 2001, 13 pages.
Adobe, "Adobe After Effects 6.5—Frequently Asked Questions," Adobe Systems Inc., 2004, 4 pages.
Adobe, "Adobe After Effects 6.5—At a Glance," Adobe Systems Inc., 2004, 4 pages.

(Continued)

*Primary Examiner*—Sherrie Hsia
(74) *Attorney, Agent, or Firm*—Hickman Palermo Truong & Becker LLP

(57) ABSTRACT

A method for digital motion picture film enhancement comprises receiving a digitized source motion picture image stream. The digitized source motion picture image stream may be recorded at about 30 frames per second (fps) and is based on an original motion picture film that was filmed at an original frame rate of 24 fps or less. A first intermediate digital image stream corresponding to and having the original frame rate is extracted. Motion interpolation is performed on the first intermediate digital image stream, resulting in creating and storing a second intermediate digital image stream of about 60 fps. Pairs of frames of the second intermediate digital image stream are digitally selected and digitally interweaved to create composite frames. The composite frames are resized, and interlacing half frames are selected to result in an output image stream of about 30 fps. Embodiments significantly enhance motion fluidity of historic telecine transfers and other filmed material.

38 Claims, 14 Drawing Sheets

OTHER PUBLICATIONS

Erickson, Leann, "Erickson After Effects 6.5 Manual," Temple University AE Handout, located on the internet at <http://astro.temple.edu/~lerickso/class/AdEdhandouts/AfterEffects%20Manual.pdf>, 7 pages.

Lawson et al., "Multimedia Module—After Effects 5 User Manuel," Arizona Board of Regents, University of Arizona, May 24, 2002, 12 pages.

Lawson et al., "Multimedia Module—After Effects 5 instructor Manual," Arizona Board of Regents, University of Arizona, May 24, 2002, 17 pages.

Nicky Pages', "NTSC, PAL & Interlace Explained," Nicky Pages' Digital Solutions, located in the internet at <http://nickyguides.digital-digest.com/interlace.htm>, 15 pages.

O'Dell, Cary, "Kinescope," The Museum of Broadcast Communications Encyclopedia, located on the internet at <http://www.museum.tv/archives/etv/K/htmlK/kinescope/kinescope.htm>, 2 pages.

Re:Vision Effects, Inc., "Twixtor User's Manual," Re:Vision Effects Inc., Twixtor User's Guide, 2004, 20 pages.

Re: Vision Effects, Inc., "Twixtor Pro User's Manual," Re: Vision Effects Inc., Twixtor User's Guide, 2004, 12 pages.

* cited by examiner

FIG. 1

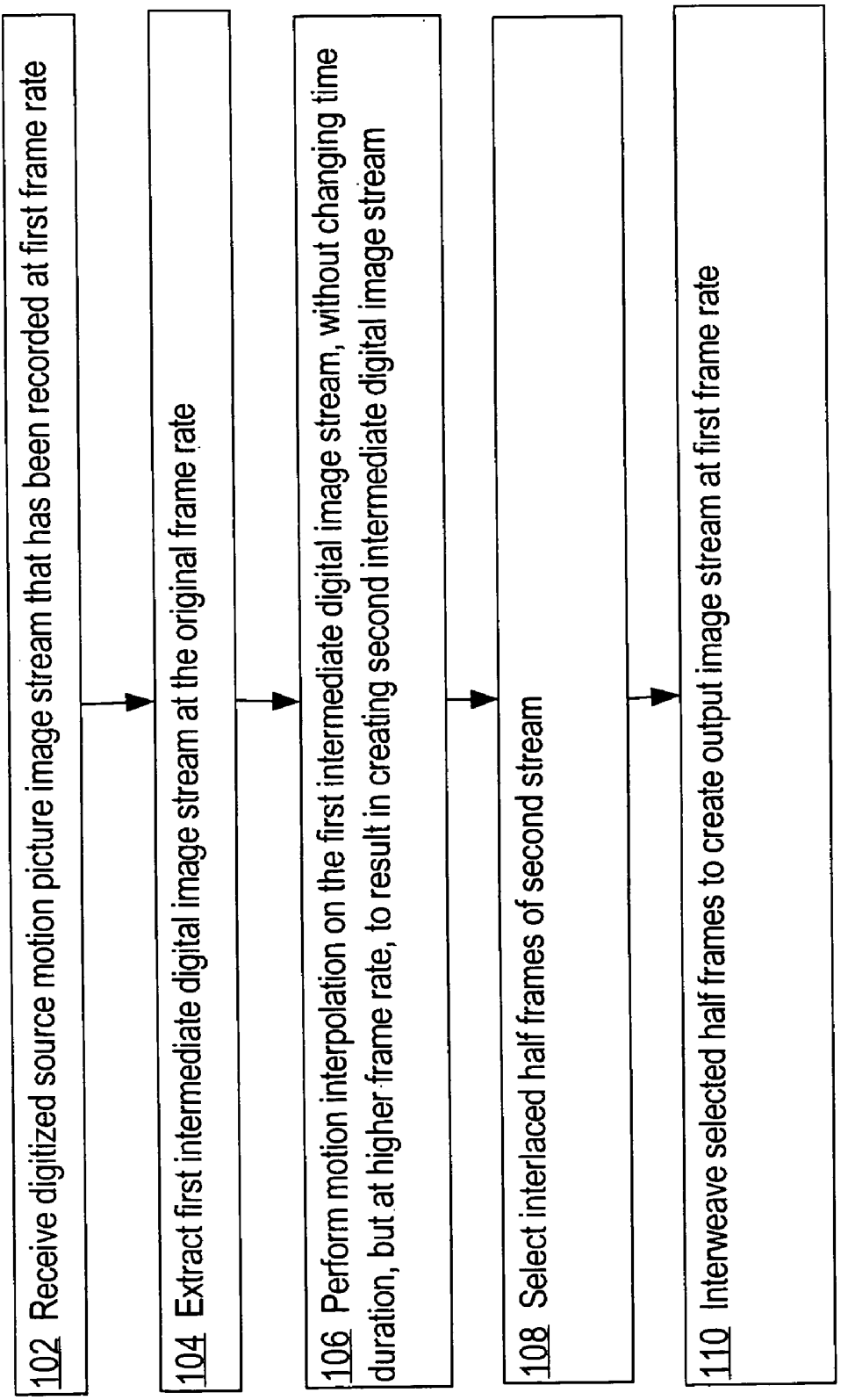

102 Receive digitized source motion picture image stream that has been recorded at first frame rate 104 Extract first intermediate digital image stream at the original frame rate 106 Perform motion interpolation on the first intermediate digital image stream, without changing time duration, but at higher frame rate, to result in creating second intermediate digital image stream 108 Select interlaced half frames of second stream 110 Interweave selected half frames to create output image stream at first frame rate

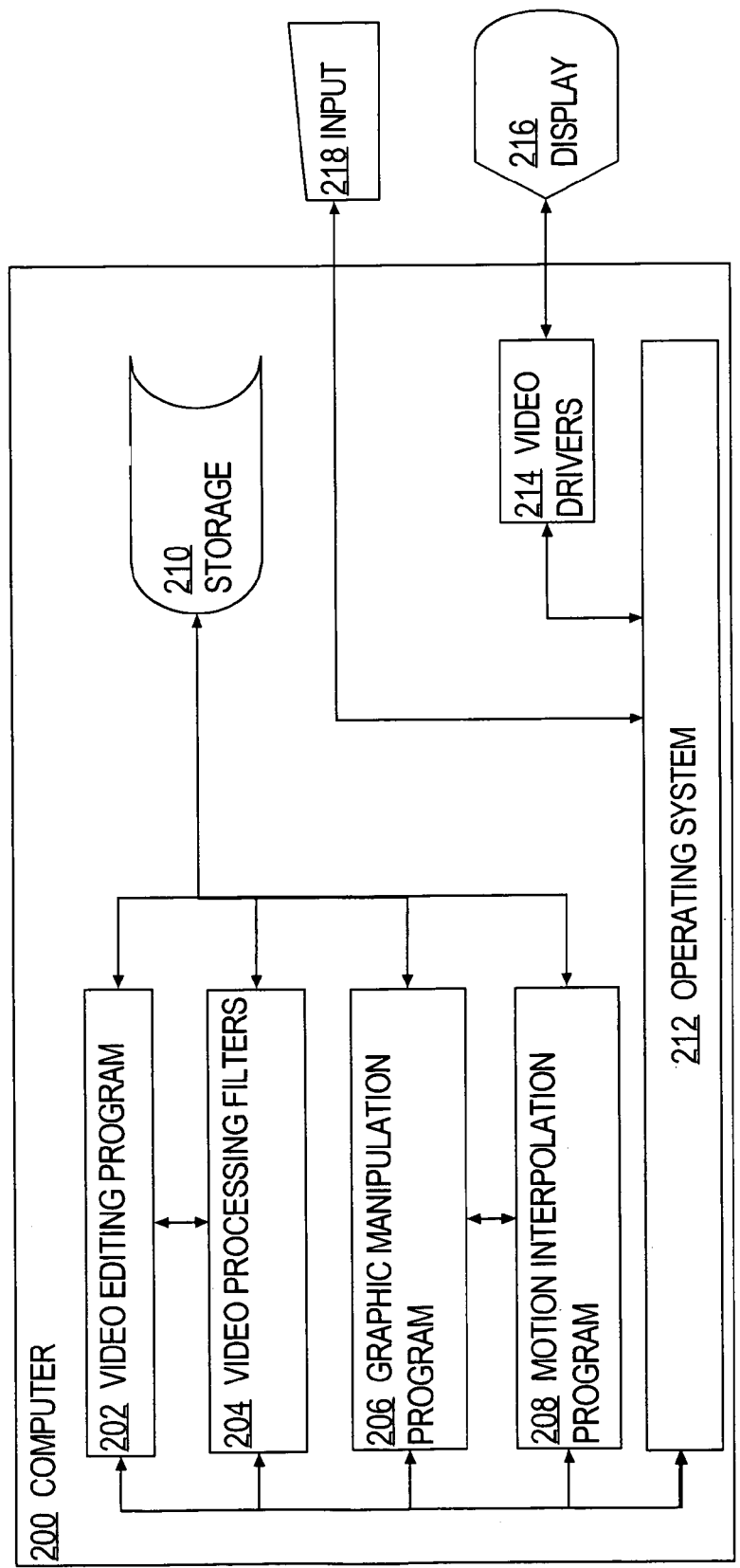

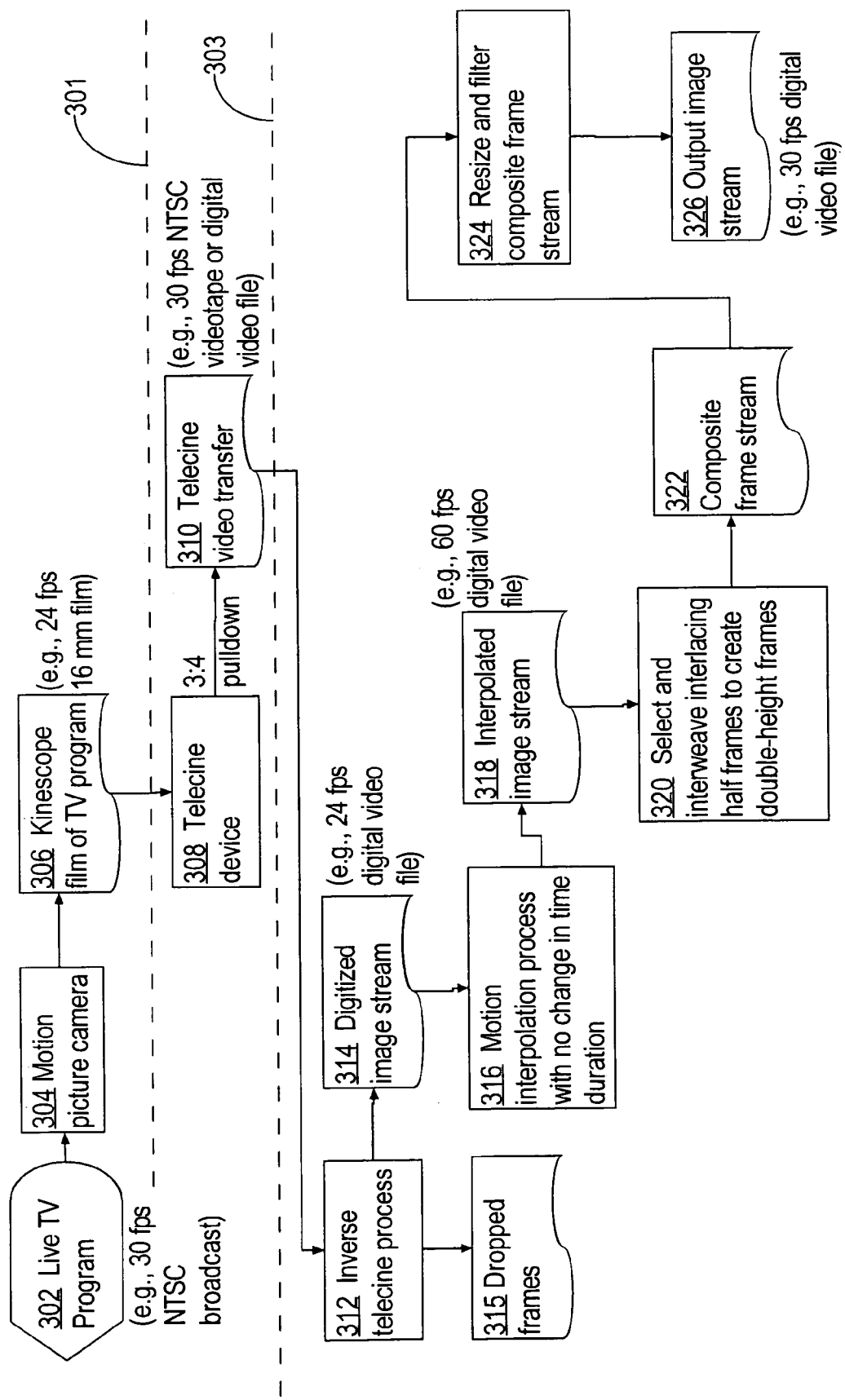

DIGITAL MOTION PICTURE FILM ENHANCEMENT APPROACHES

FIELD OF THE INVENTION

The present invention generally relates to data processing relating to digital video and motion pictures. The invention relates more specifically to techniques for digital motion picture film enhancement.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Prior to the invention of videotape in the 1960s, the only way to preserve a live television broadcast, such as broadcasts using signals conforming to standards of the US National Television Standards Committee (NTSC), was to make a motion picture film copy of the program utilizing a kinescope recording machine, which comprised a synchronized movie camera and television monitor combination. In effect, the TV program was filmed off a monitor, as the program was broadcast live. Kinescopes were widely used to make filmed copies of broadcasts from about 1940 to about 1965. Thus, in many cases kinescopes are the only record of culturally or historically important television broadcasts of the 1940s, 1950s, and early 1960s.

Although this approach preserved the program, the filmed copy of the broadcast was considered by both viewers and technicians alike to be noticeably inferior to the original program transmission. The reason for viewers and technicians to perceive the filmed copy as inferior may lie in the differences of frame rates of the television program and the film camera. A live NTSC television signal broadcasts at approximately 30 frames per second (fps). Typically, a kinescope film camera used to record the broadcast operated at about 24 fps. Therefore, filming the broadcast theoretically resulted in an automatic 16% loss of motion, because the shutter of the kinescope film camera would be closed during (30-24)=6 of 30 frames of each second of the television broadcast.

Further analysis of this problem shows that the actual loss was much greater than 16%. What viewers and technicians term one "frame" of an NTSC broadcast technically comprises two interleaved half-frames taken 1/60 of a second apart. Hence, an NTSC signal does not comprise 30 static frames per second; the signal actually comprises 60 unique and dynamic half-frames, which are designed to interleave in 30 pairs per second.

The use of a rate of 60 fps, in combination with the characteristic of the human eye termed "persistence of vision," provides a perception of natural motion in an NTSC broadcast signal. Further, the fact that NTSC broadcasts use 60 fps is why kinescopes, or any film that is broadcast over an NTSC system, has a flickering, jittery quality of motion, when compared to live action or videotape. Such kinescopes or films do not comprise enough unique frames per second to give the illusion of natural motion or to accurately reproduce all 60 fps of an NTSC television signal. Film can only provide 24 of the needed 60 images per second.

However, historians, broadcasters, and others are interested in bringing historic television programs back to the screen, if the historic programs can be shown with quality that is acceptable to the contemporary viewer. Merely broadcasting a video transfer of a kinescope results in a program of unacceptable motion quality for the typical viewer. Based on the foregoing, there is a clear need for an improved approach for processing kinescopes, other filmed copies of television broadcasts, and other motion picture film, prior to re-broadcast with contemporary equipment.

BRIEF DESCRIPTION OF THE DRAWINGS

The present invention is illustrated by way of example, and not by way of limitation, in the figures of the accompanying drawings and in which like reference numerals refer to similar elements and in which:

FIG. 1 is a flow diagram that illustrates a high level overview of one embodiment of a method for digital motion picture film enhancement;

FIG. 2 is a block diagram of a computer software architecture that may be used in an embodiment;

FIG. 3 is a data flow diagram that shows another embodiment of a method for digital motion picture film enhancement, and data files produced thereby;

DETAILED DESCRIPTION

Figure 4:
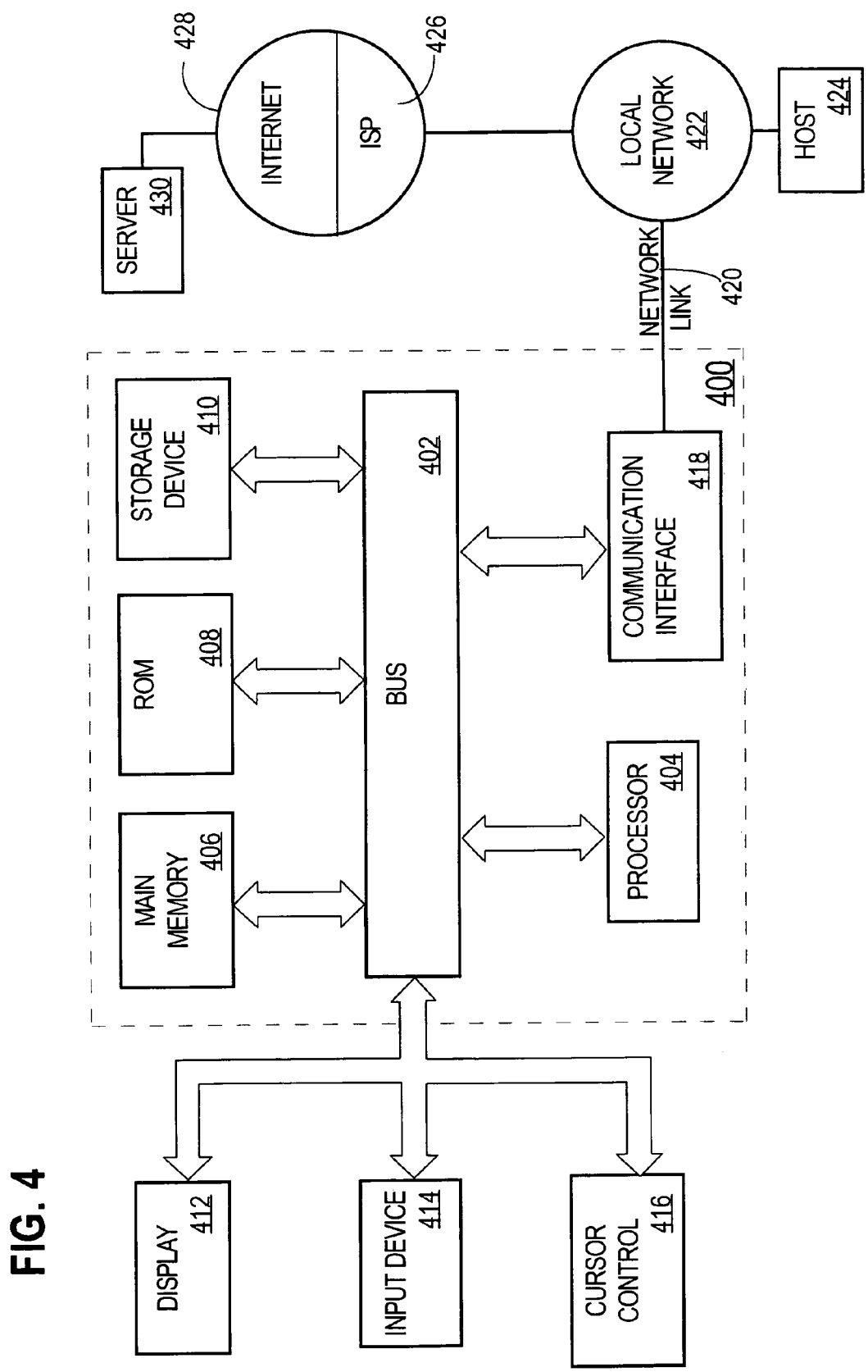
FIG. 4 is a block diagram that illustrates a computer system upon which an embodiment may be implemented.

Digital motion picture enhancement approaches are described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

1.0 General Overview
   2.0 Structural and Functional Overview
   3.0 Digital Motion Picture Enhancement Approaches
   4.0 Implementation Mechanisms—Hardware Overview
   5.0 Extensions and Alternatives

1.0 GENERAL OVERVIEW

The needs identified in the foregoing Background, and other needs and objects that will become apparent for the following description, are achieved in the present invention, which comprises, in one aspect, a method, comprising the computer-readable steps of receiving a digitized source motion picture image stream, wherein the digitized source motion picture image stream has been recorded at a television frame rate and is based on an original motion picture film that was filmed at an original frame rate of less than the television frame rate; digitally extracting, from the digitized motion picture image stream, a first intermediate digital image stream corresponding to and having the original frame rate; performing electronic digital motion interpolation upon the first intermediate digital image stream, resulting in creating and storing a second intermediate digital image stream of about double the television frame rate; digitally selecting, from the second intermediate digital image stream, pairs of frames of the second intermediate digital image stream; digitally interweaving the selected pairs of frames to create composite frames; digitally resizing the composite frames and selecting interlacing half frames from among the composite frames to result in creating an output image stream of the television frame rate.

In one feature, the television frame rate is about 30 frames per second (fps). In another feature, the original frame rate is about 24 fps. In yet another feature, the digitized source motion picture image is a telecine video transfer of a kinescope film, and the original motion picture film is the kinescope film. In a further feature, the digitized source motion picture image is a 30 fps telecine transfer of a 24 fps kinescope original.

In still another feature, a first time duration of the first intermediate digital image stream is equal to a second time duration of the second intermediate digital image stream. In yet another feature, the first extracting step comprises identifying and storing one or more original frames of the original digitized motion picture image stream, and discarding one or more hybrid frames. In a further feature, the original motion picture film is a 24 fps kinescope of a 30 fps NTSC television program.

In one feature, the second intermediate digital image is stored at 59.94 fps, a first time duration of the first intermediate digital image stream is equal to a second time duration of the second intermediate digital image stream. In a related feature, the output image stream is created at 29.97 fps.

One approach uses motion interpolation software to create 60 full frames per second from the existing 24 fps contained in a kinescope film image. The 60 full frames are then split into interlacing half frames, of which part are subsequently re-woven into a standard video signal. Allowing for minor image distortions introduced in the kinescoping and motion-interpolation processes, the resulting video is an extremely close approximation of the look of the original live broadcast transmission.

According to another aspect, the invention provides a digital video processing apparatus, comprising one or more processors; digital read-write storage coupled to the processors; a video editing/processing program stored in the storage; one or more video filters stored in the storage; a graphics manipulation program stored in the storage; and a motion interpolation program stored in the storage. The programs are configured with parameter values such that upon execution of the programs, the programs cause the one or more processors to perform the steps of the method described above.

In another aspect, the invention provides a method for digital motion picture film enhancement comprises receiving a digitized source motion picture image stream. The digitized source motion picture image stream may be recorded at about 30 frames per second (fps) and is based on an original motion picture film that was filmed at an original frame rate of 24 fps or less. A first intermediate digital image stream corresponding to and having the original frame rate is extracted. Motion interpolation is performed on the first intermediate digital image stream, resulting in creating and storing a second intermediate digital image stream of about 60 fps. Pairs frames of the second intermediate digital image stream are digitally selected and digitally interweaved to create composite frames. The composite frames are digitally resized and interlacing half frames are selected from among the composite frames to result in an output image stream of about 30 fps. Embodiments significantly enhance the perceived fluidity of motion of historic telecine transfers and other filmed material.

In one embodiment, the approach herein provides a computerized process which utilizes modern motion interpolation software to manipulate a kinescope film-to-video transfer in such a way that the resulting video file regains the motion, depth and fluidity of the original television broadcast.

In other aspects, the invention encompasses a computer apparatus and a computer-readable medium configured to carry out the foregoing steps, and a digital video recording produced by the process described above.

2.0 STRUCTURAL AND FUNCTIONAL OVERVIEW

FIG. 1 is a flow diagram that illustrates a high level overview of one embodiment of a method for digital motion picture film enhancement. In step 102, a digitized source motion picture image stream is received. In this description, all references to a digital image "stream" refer equally to a digital file or other source of digital image information; embodiments do not require the use of streaming video, or particular digital file formats. The source motion picture stream has been recorded at a first frame rate. Typically the first frame rate is 30 fps. The source motion picture stream may comprises a video transfer of a kinescope film, or any other film. Typically the original film has been filmed at a frame rate that is lower than the first frame rate, e.g., 24 fps, 20 fps, etc.

In step 104, a first intermediate digital image stream is extracted, at the original frame rate. Step 104 generally involves processing the digitized source motion picture image stream to recover the original frames at the original frame rate of the original film.

In step 106, motion interpolation is performed on the first intermediate digital image stream, without changing its time duration, but at a higher frame rate, to result in creating a second intermediate digital image stream. In step 108, pairs of frames of the second intermediate digital image stream are selected from the second intermediate digital image stream and interwoven to create composite frames. In step 110, the composite frames are digitally resized, and interlacing half frames are selected half frames and are interwoven, to create an output image stream matching a desired frame rate. Typically the output image stream frame rate is a broadcast frame rate, e.g., 30 fps.

The process may be used to prepare kinescope film for broadcast television transmission as follows. A 30 fps telecine video transfer of the kinescope film is obtained. The film is typically professionally transferred, with a standard 3:2 pulldown. A software process of "inverse telecine" is applied to the kinescope transfer, to extract the content of the original 24 fps image stream. Motion-interpolation software is applied to the 24 fps input file, to transform it to a 60 fps output file, without changing the time duration. Interlacing half-frames are extracted from the 60 fps video stream, which are then interwoven into a standard video stream. This recreated video stream now has the "live motion" look of the original program as broadcast.

In one embodiment, the final video stream is standard NTSC 30 fps video. In alternative embodiments, the final video stream is HDTV, PAL, SECAM, or any other desired video output format. Further, in this description, while certain embodiments and examples refer to NTSC, in all such cases the broad approaches described herein are equally applicable to HDTV, PAL, SECAM, and other video formats.

FIG. 2 is a block diagram of a computer software architecture that may be used in an embodiment. A computer 200 comprises an operating system 212 that manages and hosts a video editing program 202, video processing filters 204, graphic manipulation program 206, and motion interpolation program 208, which are coupled to and interact with storage 210. Operating system 212 also interfaces to one or more input devices, collectively represented as input 218, and video drivers 214 that drive a video display 216.

For purposes of illustrating a clear example, video editing program 202, video processing filters 204, graphic manipulation program 206, and motion interpolation program 208 are shown as separate functional elements of FIG. 2. In other embodiments, various functions of a video editing program 202, video processing filters 204, graphic manipulation program 206, and motion interpolation program 208 may be combined or integrated into viewer elements than shown in FIG. 2, or distributed among more elements than shown in FIG. 2.

Computer 200 may be any general-purpose computer, workstation or server that has processing power and storage resources sufficient to perform the functions that are described herein. Operating system 212 is typically a commercial OS that provides a graphical user interface, such as Microsoft Windows, LINUX, Sun Solaris, etc. Commercial software systems may be used to implement video editing program 202, video processing filters 204, graphic manipulation program 206, and motion interpolation program 208. In one specific embodiment, a video editing program 202 comprises Virtualdub version 1.5.8 and associated filters; video processing filters 204 comprise Avisynth version 2.55, which is a collection of script-driven video processing filters; graphic manipulation program 206 comprises Adobe After Effects version 5.5; and motion interpolation program 208 comprises RE:Vision Twixtor version 4.5, which is a motion-interpolation plug-in to After Effects, designed to re-time input footage in both frame speed and time duration.

Figure 5A:
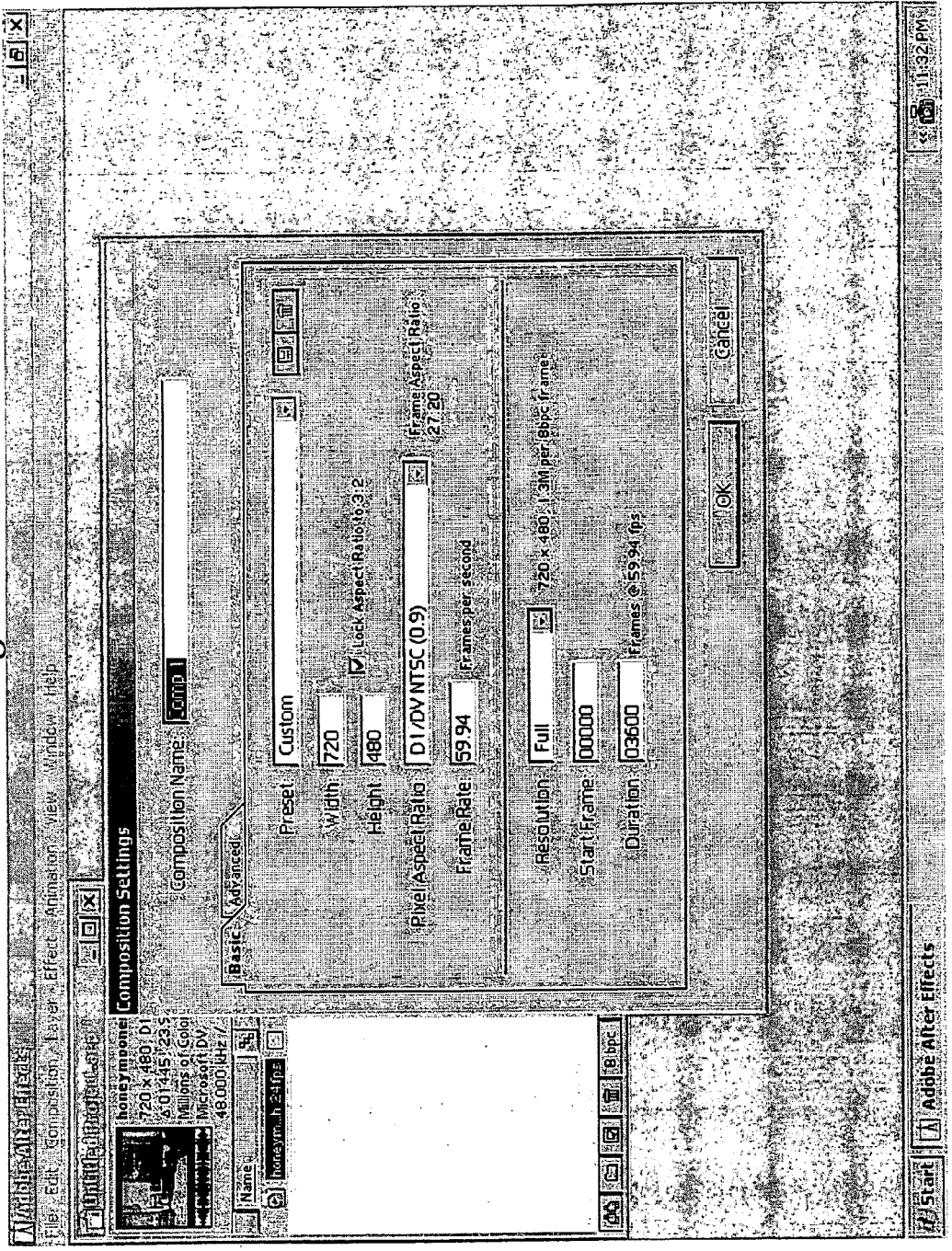
FIG. 5A is a screen display diagram showing Adobe After Effects composition settings that may be used in an embodiment.
Figure 5B:
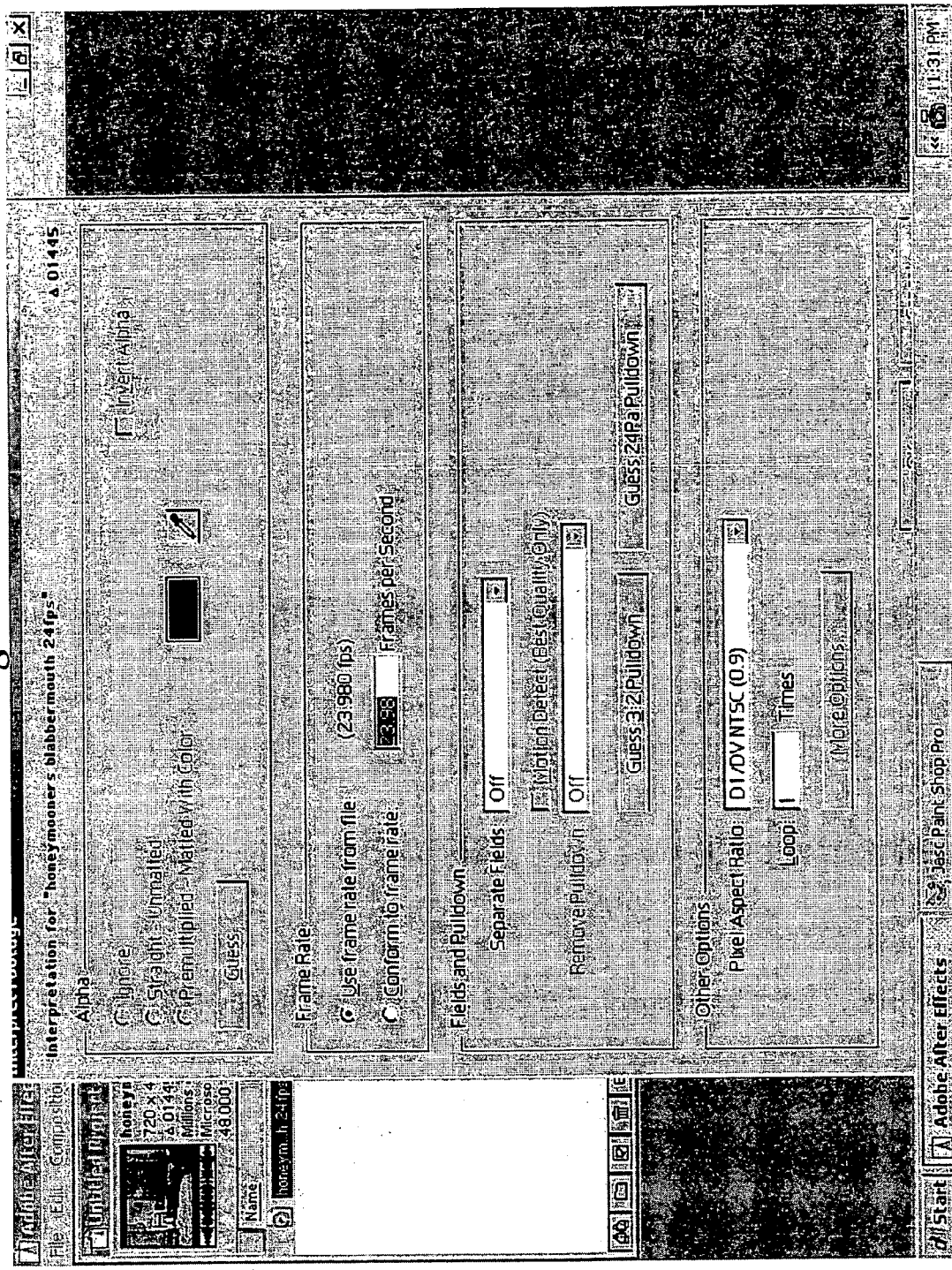
FIG. 5B is a screen display diagram showing Adobe After Effects imported file interpretation settings that may be used in an embodiment.
Figure 5C:
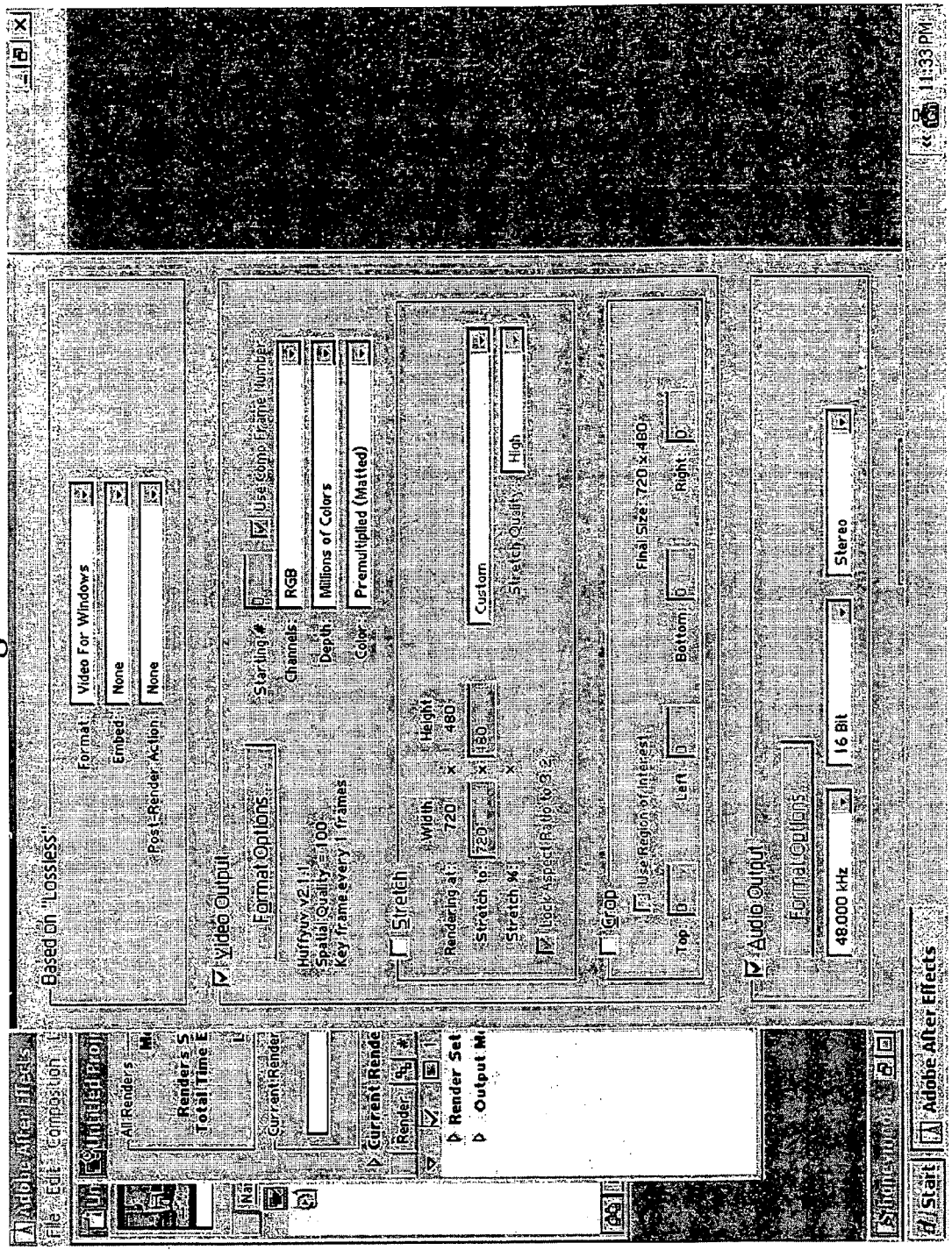
FIG. 5C is a screen display diagram showing Adobe After Effects output module settings that may be used in an embodiment.
Figure 5D:
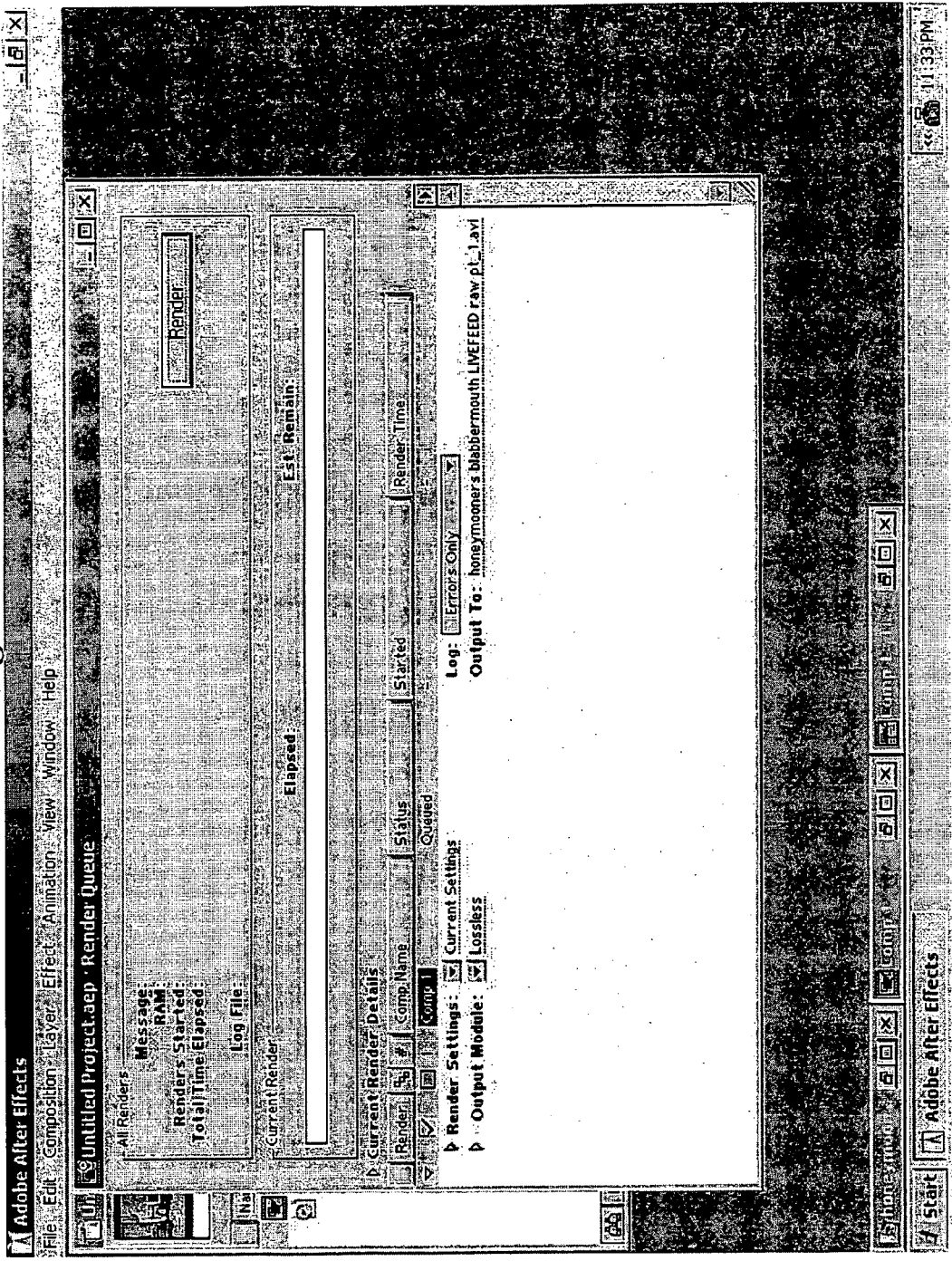
FIG. 5D is a screen display diagram showing Adobe After Effects render queue settings that may be used in an embodiment.
Figure 5E:
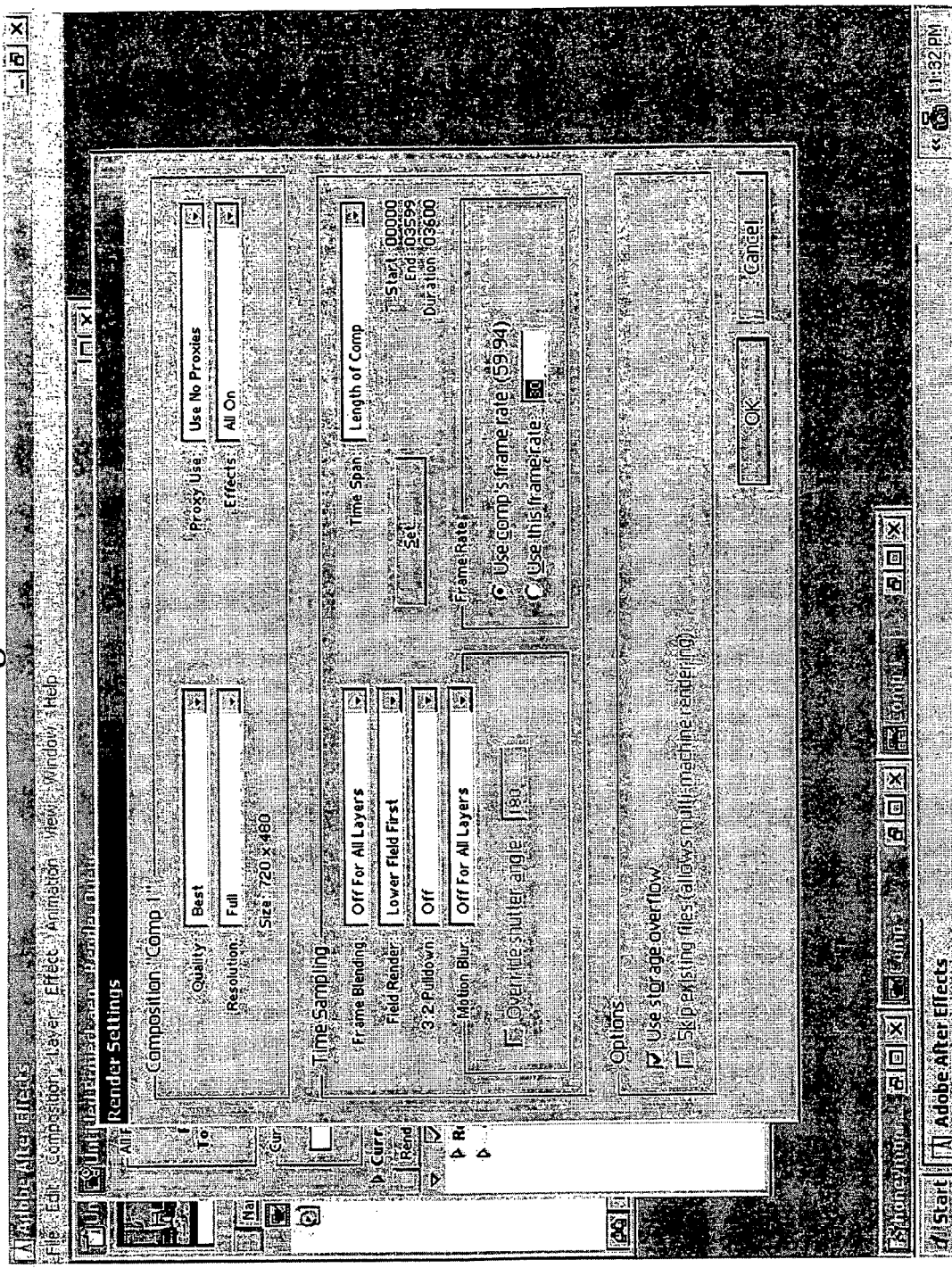
FIG. 5E is a screen display diagram showing Adobe After Effects render settings that may be used in an embodiment.
Figure 5F:
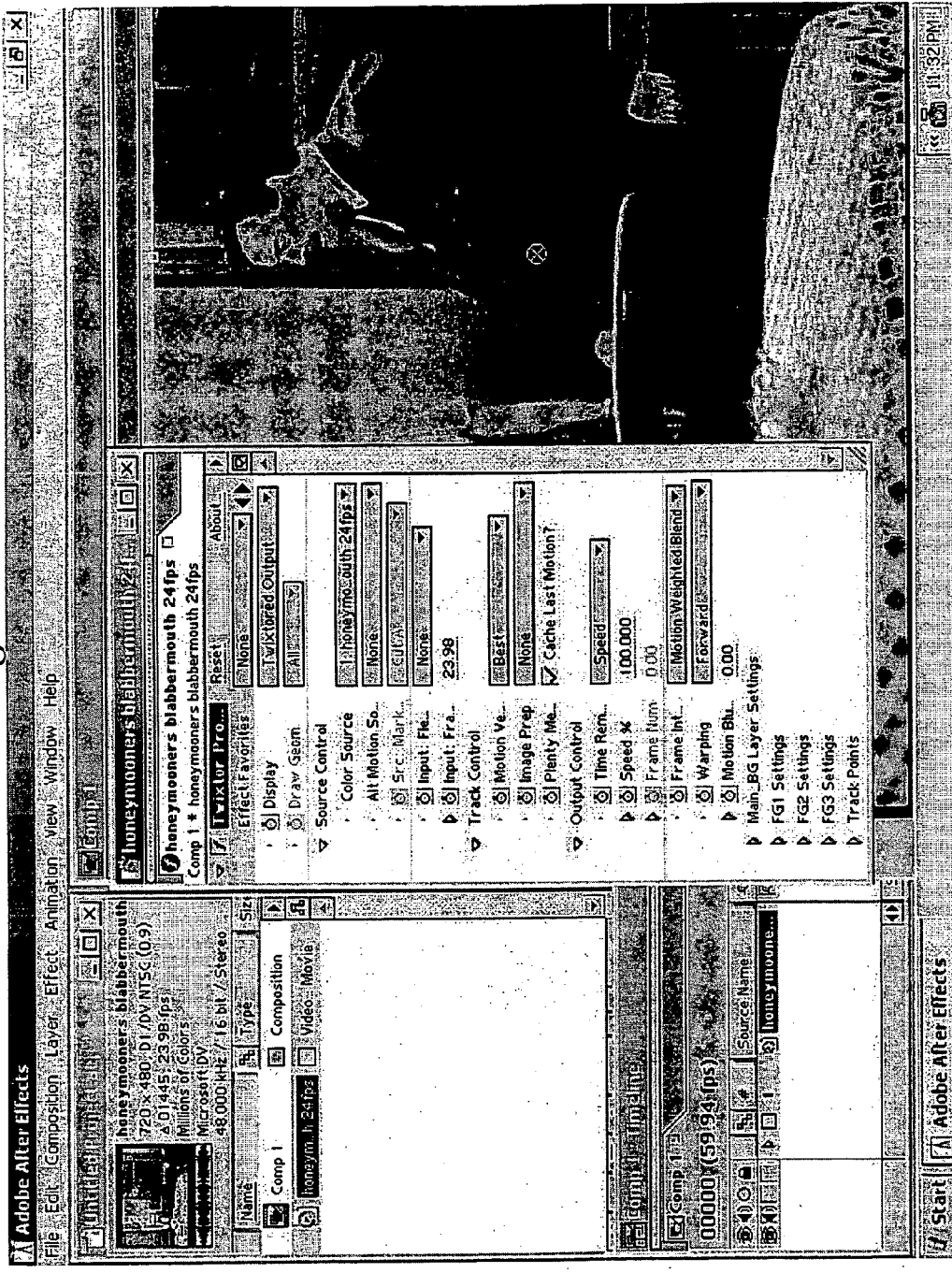
FIG. 5F is a screen display diagram showing Twixtor settings that may be used in an embodiment.
Figure 5G:
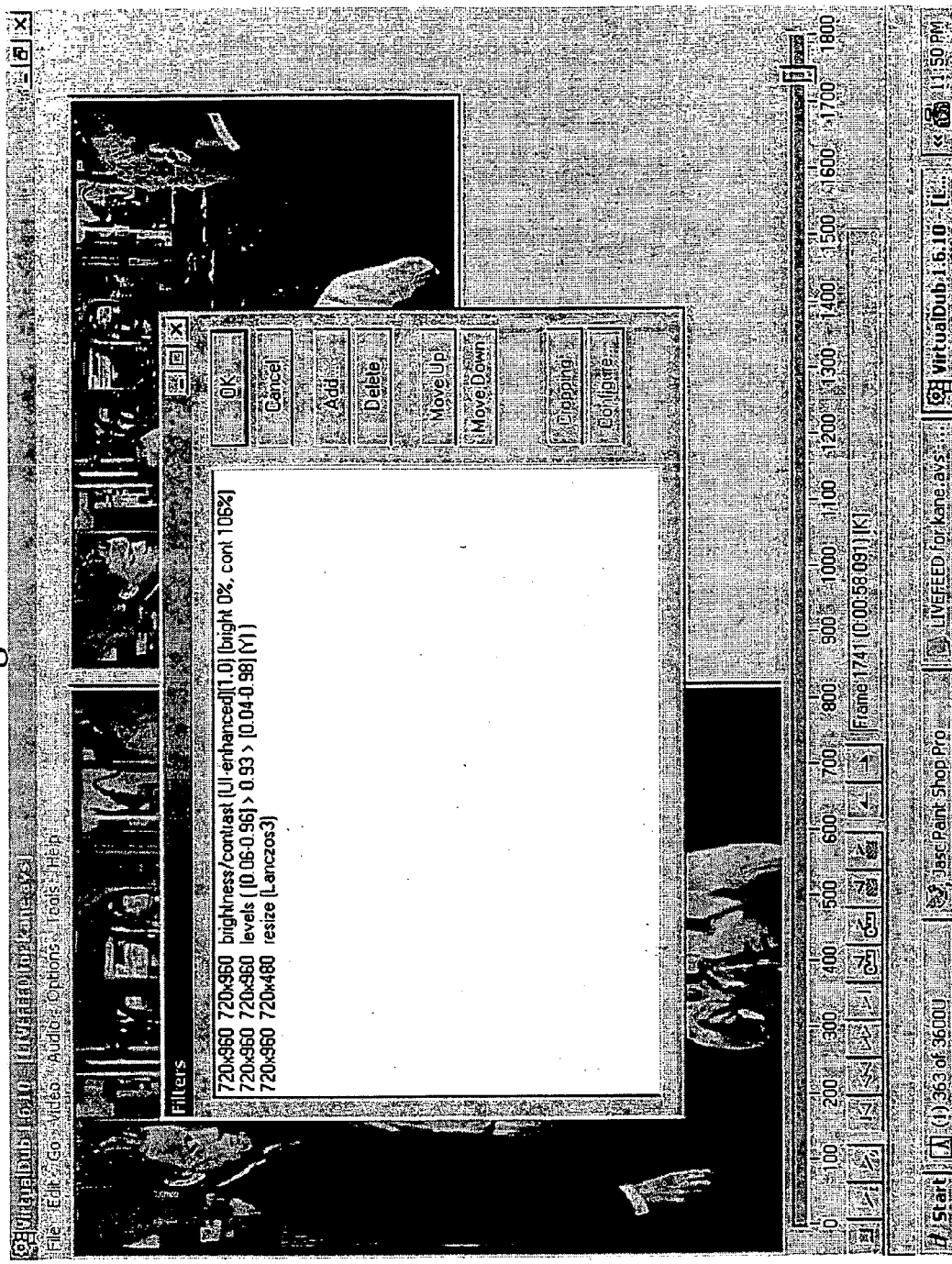
FIG. 5G is a screen display diagram showing a Virtualdub filter chain that may be used in an embodiment.
Figure 5H:
FIG. 5H is a screen display diagram showing examples of an input frame to Virtualdub and a filtered output frame, as used in an embodiment and resized based on FIG. 5G.
Figure 5I:
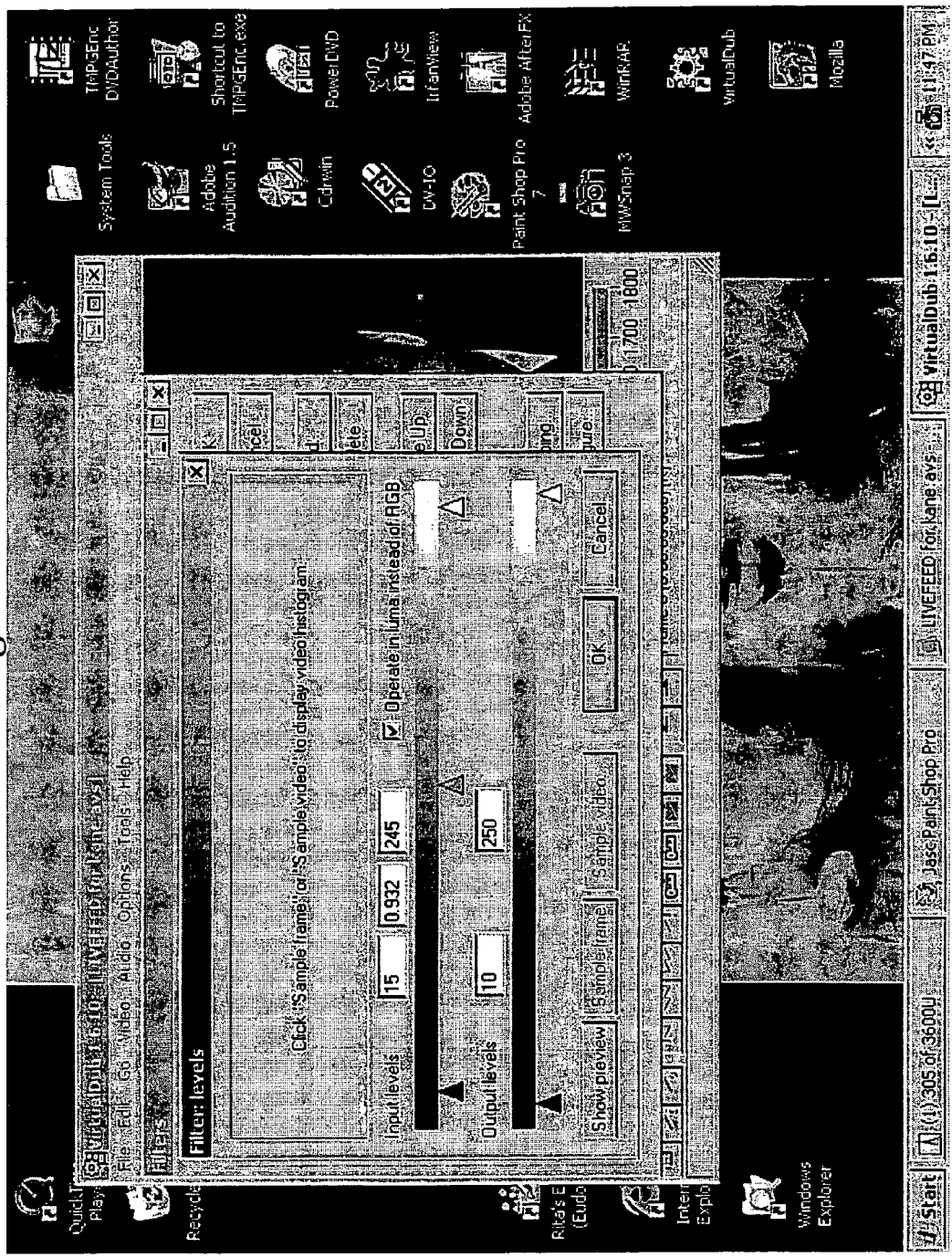
FIG. 5I is a screen display diagram showing Virtualdub filter level settings that may be used in an embodiment for a level filter shown in FIG. 5G.
Figure 5J:
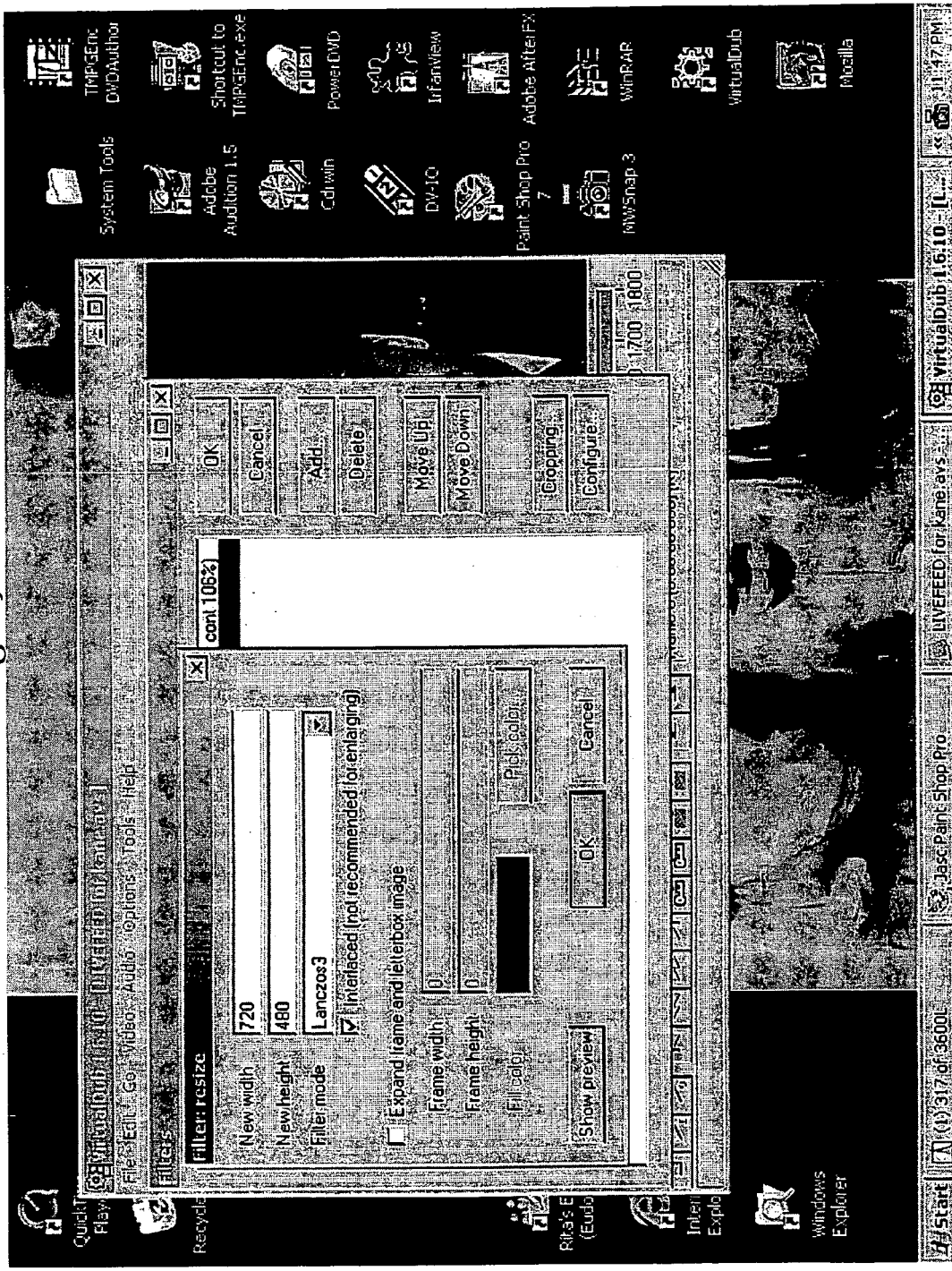
FIG. 5J is a screen display diagram showing Virtualdub resize filter settings that may be used in an embodiment for a resize filter shown in FIG. 5G.

FIGS. 5A to 5J are screen display diagrams that show user interface elements of software programs that may be used to implement an embodiment. In particular, FIG. 5A is a screen display diagram showing Adobe After Effects composition settings that may be used in an embodiment; FIG. 5B is a screen display diagram showing Adobe After Effects imported file interpretation settings that may be used in an embodiment; FIG. 5C is a screen display diagram showing Adobe After Effects output module settings that may be used in an embodiment; FIG. 5D is a screen display diagram showing Adobe After Effects render queue settings that may be used in an embodiment; FIG. 5E is a screen display diagram showing Adobe After Effects render settings that may be used in an embodiment; FIG. 5F is a screen display diagram showing Twixtor settings that may be used in an embodiment; FIG. 5G is a screen display diagram showing a Virtualdub filter chain that may be used in an embodiment; FIG. 5H is a screen display diagram showing examples of an input frame to Virtualdub and a filtered output frame, which has been resized based on FIG. 5G, as used in an embodiment; FIG. 5I is a screen display diagram showing Virtualdub filter level settings that may be used in an embodiment for a level filter shown in FIG. 5G; FIG. 5J is a screen display diagram showing Virtualdub resize filter settings that may be used in an embodiment for a resize filter shown in FIG. 5G.

3.0 DIGITAL MOTION PICTURE ENHANCEMENT APPROACHES

FIG. 3 is a data flow diagram that shows another embodiment of a method for digital motion picture film enhancement, and data files produced thereby. For purposes of illustrating a clear example, FIG. 3 is illustrated herein in conjunction with FIGS. 5A-5J and FIG. 2. However, in other embodiments, the broad approach of FIG. 3 may be implemented using other arrangements of software, screen displays, and computer hardware.

Referring first to FIG. 3, a live television program 302 is broadcast and displayed on a video monitor or television. Typically, the television program is an NTSC broadcast at 30 fps. However, the approach herein is not limited to any particular original broadcast frame rate. The video monitor or television is coupled to a motion picture camera 304 that films the broadcast off the monitor or television, resulting in creating a kinescope film 306 of the TV program.

Typically, the kinescope film is a 24 fps 16 mm film, but the approach herein is not limited to any particular type of motion picture film, film frame rate, or film frame size. For example, the approach herein can be applied to motion picture film that was not originally associated with a television broadcast. As a specific example, the Abraham Zapruder film of President John F. Kennedy at Dallas on Nov. 22, 1963, could be processed using the approach herein.

As indicated by broken line 301, process steps involving program 302, camera 304, and film 306 may occur at a time earlier than other steps and elements shown in FIG. 3. For example, film 306 could have been produced years before the other steps of FIG. 3 are performed, but the approach of FIG. 3 is not limited to any particular timing.

Kinescope film 306 is provided to a telecine device 308, so that a video transfer 310 of the original kinescope film is obtained. In one embodiment, video transfer 310 is a straight 24 fps transfer of the film 306. Alternatively, video transfer 310 is a standard 30 fps telecine transfer, utilizing a 3:2 pulldown process to adjust the frame rate of film 306 to the faster frame rate of video. Thus, in one embodiment, video transfer 310 is a 30 fps NTSC videotape or digital video file. If the video transfer 310 is a 30 fps videotape transfer, the transfer is digitized and transferred to storage 210 of computer 200, for further processing.

As indicated by broken line 303, process steps involving telecine device 308 and video transfer 310 may occur at a time earlier than other steps and elements shown in FIG. 3. For example, video transfer 310 could have been produced years before the other steps of FIG. 3 are performed, but the approach of FIG. 3 is not limited to any particular timing.

An inverse telecine process 312 is applied to the video transfer 310, resulting in creating a digitized image stream 314 and a set of dropped frames 315. In inverse telecine process 312, the original film frames are isolated from the video stream of transfer 310 using a software process that finds the original 24 fps film images, and discards the extra hybrid frames created in the 3:2 telecine transfer process. The result, digitized image stream 314, is a digitized replica of the 24 fps image stream of kinescope film 306. The dropped frames 315 are not used further and may be deleted from storage.

In an embodiment, the inverse telecine process may be implemented using the "Decomb521.dll" plug-in to Avisynth by executing the following script:

LoadPlugin("c:\\Program Files\\Avisynth 2.5\\Plugins\\Decomb521.dll")

AVISource("d:\\raw video captures 2\kane clip.avi")

Telecide(order=0)

Decimate(cycle=5)

In which "kane clip.avi" is the video transfer file.

At step 316, a motion interpolation process is applied to digitized image stream 314, with no change in time duration, to result in creating an interpolated image stream 318 having approximately double the desired final frame rate.

In one embodiment, Adobe After Effects is opened, and a portion of the 24 fps file, corresponding to digitized image stream 314, is loaded into a "new project" within the program. In practice, for convenience, the digitized image stream 314 may be split up into short pieces, which results in final processed files of a convenient size. The pieces are edited back together after completion of the process at step 324. In one embodiment, pieces are one minute long and use a file size of 1445 frames.

A "new composition" is started, with a frame rate of 59.94 fps, which will be the frame rate of the processed output file. The frame rate of 59.94 is selected because it is the frame rate for NTSC interleaved half frames. Other frame rates may be used in implementations for standards other than NTSC. In an embodiment, when an input file duration of one minute (60 seconds) is used, the output file is set for a total of 3600 frames. The Adobe After Effects composition settings of FIG. 5A, interpret footage settings of FIG. 5B, output module settings of FIG. 5C, render queue settings of FIG. 5D, and render settings of FIG. 5E may be used.

The previously loaded 24 fps file, corresponding to digitized image stream 314, is brought into the "new composition". At this point, motion-interpolation software is activated, for use on the input video file. In an embodiment, RE:Vision Twixtor, a plug-in for After Effects, is used. However, any motion-interpolation software can be used, if both the frame rate and duration of the final output file can be controlled. In the approach herein, the frame rate of the file is changed (to 59.94 fps), but its time duration is unchanged.

The Twixtor plug-in parameters are set accordingly, as in FIG. 5F, and the "Make Movie" option of After Effects is then selected. The final file output settings in After Effects are then adjusted. For example, the render settings are adjusted as shown in FIG. 5E. An output file name is chosen. The "Render" function is selected. In response, the motion interpolation software creates extra necessary frames based on the existing frames, represented as interpolated image stream 318.

In certain embodiments, creating interpolated extra frames may consume considerable time, if the Twixtor plug-in's specific parameters are chosen for quality of image rather than speed of frame creation. In an embodiment, a one-minute file has been found to take about 3.5 hours to fully render. Shorter rendering times could be achieved on high-powered computing hardware.

At step 320, pairs of frames are selected from the interpolated image stream 318 and interwoven to create composite frames. In one embodiment, when an output file is fully rendered using After Effect and Twixtor, the output file is loaded using an Avisynth filter script into Virtualdub for final assembly. Further, the filter chain settings of FIG. 5G may be used.

Step 320 may be implemented using a script, with which consecutive pairs of output frames (e.g., frames 1+2, 3+4, 5+6, etc.) are selected and inter-woven, yielding a stream of composite frames 322, each of which is logically twice as tall as a standard frame. FIG. 5H illustrates a composite frame and a filtered standard-height frame. In this context, "interweaving" refers to alternatively obtaining a line of pixels from each of the frame pairs and placing such alternate lines of pixels consecutively in the output composite frame. For example, pixel line 1 of frame 1 and pixel line 1 of frame 2 are read, and the two pixel lines are written to the output as pixel lines 1, 2 of a first composite frame.

As an example of an interweaving script, to interweave frames of a video file named "Video File.avi" in a filesystem folder named "Folder," the following script may be used:
AVISource("d:\\Folder\Video File.avi") AssumeFieldBased.weave In step 324, the interwoven frames are resized to result in creating an output image stream 326. Concurrently, interlaced half frames are selected to result in the output image stream 326. For example, using a resizing filter in Virtualdub, tall frame images are re-sampled and resized to standard dimensions, in an interlaced fashion. FIG. 5H illustrates a composite or tall frame and an output frame at standard height; the filter settings of FIG. 5I, 5J may be used in certain embodiments. As the new frames have been created from pairs of the previous frames, the resulting blend brings the file's frame count back down to 1800, and the frame rate is now once again NTSC standard.

In this approach, output image stream 326 comprises interlacing half-frames drawn from 60 unique and dynamic images, which may be displayed at a rate of 60 interlacing half-frames per second. Thus, output image stream 326 is identical in format to the original broadcast at the time that the program first aired. Embodiments have been found to produce video with motion that is smooth and has increased depth & fluidity.

After step 326, any single frames that were created through interpolation and that have noticeable artifacts may be edited to remove the artifacts. In this context, "artifacts" refers to depictions of dirt, hair, dust or other spurious material that is replicated in the interpolated frames.

Further, the soundtrack may be suitably processed and synchronized to the video image. Optionally, additional filtering or digital video noise reduction may be employed to minimize visible grain or other flaws.

Steps 320-324 are optional. In certain embodiments, creating composite frames and resizing the composite frames is omitted. In this approach, interlacing half frames are selected directly from the interpolated image stream 318.

The approach herein is applicable to any filmed material that has an original frame rate that is less than a desired output frame rate. For example, the approach may be used with any 24 fps filmed material, whether produced through a kinescope process or not. Further, the frame rate of the original film need not be 24 fps. For example, many silent films produced in the years 1900-1930 were shot at 20 fps; such films can be processed successfully with the approach herein. Some amateur films are made at frame rates of less than 24 fps. Further, professional films have been shot at greater than 24 fps; the master of the film "Oklahoma!" was shot at 29.97 fps.

4.0 IMPLEMENTATION MECHANISMS

Hardware Overview

FIG. 4 is a block diagram that illustrates a computer system 400 upon which an embodiment of the invention may be implemented. Computer system 400 includes a bus 402 or other communication mechanism for communicating information, and a processor 404 coupled with bus 402 for processing information. Computer system 400 also includes a main memory 406, such as a random access memory ("RAM") or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory ("ROM") 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube ("CRT"), for displaying information to a computer user. An input device 414, including alphanumeric and other keys, is coupled to bus 402 for communicating information and command selections to processor 404. Another type of user input device is cursor control 416, such as a mouse, trackball, stylus, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

The invention is related to the use of computer system 400 for digital motion picture enhancement approaches. According to one embodiment of the invention, digital motion picture enhancement approaches are provided by computer system 400 in response to processor 404 executing one or more sequences of one or more instructions contained in main memory 406. Such instructions may be read into main memory 406 from another computer-readable medium, such as storage device 410. Execution of the sequences of instructions contained in main memory 406 causes processor 404 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 404 for execution. Such a medium may take many forms, including but not limited to, non-volatile media, volatile media, and transmission media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infrared transmitter to convert the data to an infrared signal. An infrared detector can receive the data carried in the infrared signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network ("ISDN") card or a modem to provide a data communication connection to a corresponding type of telephone line. As another example, communication interface 418 may be a local area network ("LAN") card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider ("ISP") 426. ISP 426 in turn provides data communication services through the worldwide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418. In accordance with the invention, one such downloaded application provides for digital motion picture enhancement approaches as described herein.

The received code may be executed by processor 404 as it is received, and/or stored in storage device 410, or other non-volatile storage for later execution. In this manner, computer system 400 may obtain application code in the form of a carrier wave.

5.0 EXTENSIONS AND ALTERNATIVES

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

For example, in one embodiment, the steps of selecting pairs of frames, creating composite frames, and resizing the composite frames may be omitted. In such an embodiment, interlacing half frames may be selected directly from the interpolated image stream. Thus, in one embodiment, a method may involve receiving a digitized source motion picture image stream, wherein the digitized source motion picture image stream has been recorded at a television frame rate and is based on an original motion picture film that was filmed at an original frame rate of less than the television frame rate; digitally extracting, from the digitized motion picture image stream, a first intermediate digital image stream corresponding to and having the original frame rate; performing electronic digital motion interpolation upon the first intermediate digital image stream, resulting in creating and storing a second intermediate digital image stream of about double the television frame rate; and digitally selecting, from the second intermediate digital image stream, interlacing half frames to result in creating an output image stream of the television frame rate.

What is claimed is:

1. A method, comprising the computer-readable steps of:
   receiving a digitized source motion picture image stream, wherein the digitized source motion picture image stream has been recorded at a television frame rate and is based on an original motion picture film that was filmed at an original frame rate of less than the television frame rate;
   digitally extracting, from the digitized motion picture image stream, a first intermediate digital image stream corresponding to and having the original frame rate;
   performing electronic digital motion interpolation upon the first intermediate digital image stream, resulting in creating and storing a second intermediate digital image stream of about double the television frame rate;
   digitally selecting, from the second intermediate digital image stream, pairs of frames of the second intermediate digital image stream;
   digitally interweaving the selected frames to create composite frames;
   digitally resizing the composite frames and selecting interlacing half frames from among the composite frames to result in creating an output image stream of the television frame rate.

2. A method as recited in claim 1, wherein the television frame rate is about 30 frames per second (fps).

3. A method as recited in claim 1, wherein the original frame rate is about 24 fps.

4. A method as recited in claim 1, wherein the digitized source motion picture image is a telecine video transfer of a kinescope film, and wherein the original motion picture film is the kinescope film.

5. A method as recited in claim 1, wherein the digitized source motion picture image is a 30 fps telecine transfer of a 24 fps kinescope original.

6. A method as recited in claim 1, wherein a first time duration of the first intermediate digital image stream is equal to a second time duration of the second intermediate digital image stream.

7. A method as recited in claim 1, wherein the first extracting step comprises identifying and storing one or more original frames of the original digitized motion picture image stream, and discarding one or more hybrid frames.

8. A method as recited in claim 7, wherein the output image stream is created at 29.97 fps.

9. A method as recited in claim 1, wherein the original motion picture film is a 24 fps kinescope of a 30 fps NTSC television program.

10. A method as recited in claim 1, wherein the second intermediate digital image is stored at 59.94 fps, wherein a first time duration of the first intermediate digital image stream is equal to a second time duration of the second intermediate digital image stream.

11. A method as recited in claim 1, wherein digital interweaving comprises generating a stream of composite frames, and wherein the method further comprises resizing the stream of composite frames to yield an output image stream having a conventional frame size and frame rate.

12. A digital video processing apparatus, comprising:
    one or more processors;
    digital read-write storage coupled to the processors;
    a video editing/processing program stored in the storage;
    one or more video filters stored in the storage;
    a graphics manipulation program stored in the storage;
    a motion interpolation program stored in the storage;
    wherein the programs are configured with parameter values such that upon execution of the programs, the programs cause the one or more processors to perform the steps of:
    receiving a digitized source motion picture image stream, wherein the digitized source motion picture image stream has been recorded at about 30 frames per second (fps) and is based on an original motion picture film that was filmed at an original frame rate of 24 fps or less;
    digitally extracting, from the digitized motion picture image stream, a first intermediate digital image stream corresponding to and having the original frame rate;
    performing electronic digital motion interpolation upon the first intermediate digital image stream, resulting in creating and storing a second intermediate digital image stream of about 60 fps;
    digitally extracting, from the second intermediate digital image stream, pairs of frames of the second intermediate digital image stream;
    digitally interweaving the selected frames to create composite frames;
    digitally resizing the composite frames and selecting interlacing half frames from among the composite frames to result in creating an output image stream of about 30 fps.

13. An apparatus as recited in claim 12, wherein the digitized source motion picture image is a telecine video transfer of a kinescope film, and wherein the original motion picture film is the kinescope film.

14. An apparatus as recited in claim 12, wherein the digitized source motion picture image is a 30 fps telecine transfer of a 24 fps kinescope original.

15. An apparatus as recited in claim 12, wherein a first time duration of the first intermediate digital image stream is equal to a second time duration of the second intermediate digital image stream.

16. An apparatus as recited in claim 12, wherein the first extracting step comprises identifying and storing one or more original frames of the original digitized motion picture image stream, and discarding one or more hybrid frames.

17. An apparatus as recited in claim 12, wherein the original motion picture film is a 24 fps kinescope of an NTSC television program.

18. An apparatus as recited in claim 17, wherein the output image stream is created at 29.97 fps.

19. An apparatus as recited in claim 12, wherein the second intermediate digital image is stored at 59.94 fps, wherein a first time duration of the first intermediate digital image stream is equal to a second time duration of the second intermediate digital image stream.

20. A computer-readable data storage device storing one or more sequences of instructions, which instructions, when executed by one or more processors, cause the one or more processors to carry out the steps of:
receiving a digitized source motion picture image stream, wherein the digitized source motion picture image stream has been recorded at about 30 frames per second (fps) and is based on an original motion picture film that was filmed at an original frame rate of 24 fps or less;
digitally extracting, from the digitized motion picture image stream, a first intermediate digital image stream corresponding to and having the original frame rate;
performing electronic digital motion interpolation upon the first intermediate digital image stream, resulting in creating and storing a second intermediate digital image stream of about 60 fps;
digitally extracting, from the second intermediate digital image stream, pairs of frames of the second intermediate digital image stream;
digitally interweaving the selected frames to create composite frames;
digitally resizing the composite frames and selecting interlacing half frames from among the composite frames to result in creating an output image stream of about 30 fps.

21. A computer-readable data storage device as recited in claim 20, wherein the digitized source motion picture image is a telecine video transfer of a kinescope film, and wherein the original motion picture film is the kinescope film.

22. A computer-readable data storage device as recited in claim 20, wherein the digitized source motion picture image is a 30 fps telecine transfer of a 24 fps kinescope original.

23. A computer-readable data storage device as recited in claim 20, wherein a first time duration of the first intermediate digital image stream is equal to a second time duration of the second intermediate digital image stream.

24. A computer-readable data storage device as recited in claim 20, wherein the first extracting step comprises identifying and storing one or more original frames of the original digitized motion picture image stream, and discarding one or more hybrid frames.

25. A computer-readable data storage device as recited in claim 20, wherein the original motion picture film is a 24 fps kinescope of an NTSC television program.

26. A computer-readable data storage device as recited in claim 20, wherein the second intermediate digital image is stored at 59.94 fps, wherein a first time duration of the first intermediate digital image stream is equal to a second time duration of the second intermediate digital image stream.

27. A computer-readable data storage device as recited in claim 26, wherein the output image stream is created at 29.97 fps.

28. A digital storage device storing a digital video recording produced by the process of:
receiving a digitized source motion picture image stream, wherein the digitized source motion picture image stream has been recorded at a television frame rate and is based on an original motion picture film that was filmed at an original frame rate of less than the television frame rate;
digitally extracting, from the digitized motion picture image stream, a first intermediate digital image stream corresponding to and having the original frame rate;
performing electronic digital motion interpolation upon the first intermediate digital image stream, resulting in creating and storing a second intermediate digital image stream of about double the television frame rate;
digitally selecting, from the second intermediate digital image stream, pairs of frames of the second intermediate digital image stream;
digitally interweaving the selected frames to create composite frames;
digitally resizing the composite frames and selecting interlacing half frames from among the composite frames to result in creating an output image stream of the television frame rate.

29. A digital storage device as recited in claim 28, wherein the television frame rate is about 30 frames per second (fps).

30. A digital storage device as recited in claim 28, wherein the original frame rate is about 24 fps.

31. A digital storage device as recited in claim 28, wherein the digitized source motion picture image is a telecine video transfer of a kinescope film, and wherein the original motion picture film is the kinescope film.

32. A digital storage device as recited in claim 28, wherein the digitized source motion picture image is a 30 fps telecine transfer of a 24 fps kinescope original.

33. A digital storage device as recited in claim 28, wherein a first time duration of the first intermediate digital image stream is equal to a second time duration of the second intermediate digital image stream.

34. A digital storage device as recited in claim 28, wherein the first extracting step comprises identifying and storing one or more original frames of the original digitized motion picture image stream, and discarding one or more hybrid frames.

35. A digital storage device as recited in claim 28, wherein the original motion picture film is a 24 fps kinescope of a 30 fps NTSC television program.

36. A digital storage device as recited in claim 28, wherein the second intermediate digital image is stored at 59.94 fps, wherein a first time duration of the first intermediate digital image stream is equal to a second time duration of the second intermediate digital image stream.

37. A digital storage device as recited in claim 36, wherein the output image stream is created at 29.97 fps.

38. A method, comprising the computer-readable steps of:
receiving a digitized source motion picture image stream, wherein the digitized source motion picture image stream has been recorded at a television frame rate and is based on an original motion picture film that was filmed at an original frame rate of less than the television frame rate;

digitally extracting, from the digitized motion picture image stream, a first intermediate digital image stream corresponding to and having the original frame rate;

performing electronic digital motion interpolation upon the first intermediate digital image stream, resulting in creating and storing a second intermediate digital image stream of about double the television frame rate;

digitally selecting, from the second intermediate digital image stream, pairs of frames of the second intermediate digital image stream and digitally interweaving the selected frames to create composite frames;

digitally selecting, from the second intermediate digital image stream, interlacing half frames from among the composite frames to result in creating an output image stream of the television frame rate.

\* \* \* \* \*